(12) United States Patent
Argyropoulos et al.

(10) Patent No.: US 9,077,972 B2
(45) Date of Patent: Jul. 7, 2015

(54) METHOD AND APPARATUS FOR ASSESSING THE QUALITY OF A VIDEO SIGNAL DURING ENCODING OR COMPRESSING OF THE VIDEO SIGNAL

(75) Inventors: Savvas Argyropoulos, Berlin (DE); Bernhard Feiten, Berlin (DE); Marie-Neige Garcia, Berlin (DE); Peter List, Eppertshausen (DE); Alexander Raake, Berlin (DE)

(73) Assignee: DEUTSCHE TELEKOM AG, Bonn (DE)

( * ) Notice: Subject to any disclaimer, the term of this patent is extended or adjusted under 35 U.S.C. 154(b) by 125 days.

(21) Appl. No.: 13/812,868

(22) PCT Filed: Jul. 29, 2011

(86) PCT No.: PCT/EP2011/063091
§ 371 (c)(1),
(2), (4) Date: Mar. 13, 2013

(87) PCT Pub. No.: WO2012/013777
PCT Pub. Date: Feb. 2, 2012

(65) Prior Publication Data
US 2013/0208813 A1  Aug. 15, 2013

(30) Foreign Application Priority Data

Jul. 30, 2010  (EP) .................................... 10171448

(51) Int. Cl.
*H04N 7/12*  (2006.01)
*H04N 11/02*  (2006.01)
(Continued)

(52) U.S. Cl.
CPC ...... *H04N 19/00903* (2013.01); *H04N 21/6373* (2013.01); *H04N 21/64723* (2013.01);
(Continued)

(58) Field of Classification Search
CPC .................. H04N 19/00396; H04N 19/00545; H04N 21/238; H04N 21/24; H04N 21/437; H04N 21/6373; H04N 21/64723; H04N 19/00903
USPC ............................ 375/240.26, 240.25, 240.01
See application file for complete search history.

(56) References Cited

U.S. PATENT DOCUMENTS 8,135,063 B2 * 3/2012 Kwon et al. ............. 375/240.03
2013/0044224 A1 * 2/2013 Liao et al. ..................... 348/192

FOREIGN PATENT DOCUMENTS

JP      2006033722 A2    2/2006
WO   WO 2007071076 A1   6/2007

OTHER PUBLICATIONS

Garcia et al., Impairment-factor-based audio-visual quality model for IPTV, Quality of Multimedia Experience, 2009, QoMEx 2009. International Workshop on, Jul. 29, 2009 IEEE, Piscataway, NJ, USA, pp. 1-6.
(Continued)

*Primary Examiner* — Geepy Pe
(74) *Attorney, Agent, or Firm* — Leydig, Voit & Mayer, Ltd.

(57) ABSTRACT

A method for assessing the quality of a video signal during encoding or compressing of the video signal includes: estimating the quality (Qcod) of the video signal using one or more parameters; and using at least one additional parameter to adjust the estimated video signal quality, wherein the at least one additional parameter includes the key-frame rate (kfr) of the video signal as a Group of Pictures (GOP)-length-related parameter. Adjustment of the estimated video signal quality is in accordance with the following equation:

$Q\text{cod} = (a1*\text{kfr} + a2)*\exp(b*\text{br}) + c;$ where a1, a2, b, and c are coefficients and br is the bit-rate of the video signal.

15 Claims, 1 Drawing Sheet

(51) Int. Cl.
*H04N 11/04* (2006.01)
*H04N 19/85* (2014.01)
*H04N 17/00* (2006.01)
*H04N 19/61* (2014.01)
*H04N 19/14* (2014.01)
*H04N 19/154* (2014.01)
*H04N 19/166* (2014.01)
*H04N 19/177* (2014.01)
*H04N 19/48* (2014.01)
*H04N 21/6373* (2011.01)
*H04N 21/647* (2011.01)
*H04N 21/437* (2011.01)
*H04N 21/24* (2011.01)
*H04N 21/238* (2011.01)

(52) U.S. Cl.
CPC ............. *H04N21/437* (2013.01); *H04N 21/24* (2013.01); *H04N 21/238* (2013.01); *H04N 17/004* (2013.01); *H04N 19/61* (2014.11); *H04N 19/14* (2014.11); *H04N 19/154* (2014.11); *H04N 19/166* (2014.11); *H04N 19/177* (2014.11); *H04N 19/48* (2014.11); *H04N 19/85* (2014.11)

(56) References Cited

OTHER PUBLICATIONS

Garcia et al., Normalization of subjective video test results using a reference test and anchor conditions for efficient model development, Proceedings of the 2010 Second International Workshop on Quality of Multimedia Experience (QoMEX 2010), Trondheim, Norway, Jun. 21, 2001, IEEE, Piscataway, NJ, USA, pp. 88-93.

Raake et al., T-V-model: Parameter-based prediction of IPTV quality, Acoustics, Speech and Signal Processing, 2008. ICASSP 2008. IEEE International Conference on, Mar. 31, 2008, IEEE, Piscataway, NJ, USA, pp. 1149-1152.

Garcia et al., Towards content-related features for parametric video quality prediction of IPTV services, Acoustics, Speech and Signal Processing, 2008. ICASSP 2008. IEEE International Conference on, Mar. 31, 2008 IEEE, Piscataway, NJ, USA, pp. 757-760.

Javurek, Efficient models for objective video quality assessment, Radioengineering, Dec. 1, 2004, Prague, CZ, vol. 13, Nr:4, pp.48-50.

Arpad Huszak, Analysing GOP structure and packet loss effects on error propagation in MPEG-4 video streams, Communications, Control and Signal Processing (ISCCSP), 2010 4th International Symposium on, Mar. 3, 2010 IEEE, Piscataway, NJ, USA, pp. 1-5.

A. Takahashi, D. Hands, and V. Barriac, "Standardization Activities in the ITU for a QoE Assessment of IPTV," in *IEEE Communication Magazine*, Dec. 2008.

S. Winkler and P. Mohandas, "The Evolution of Video Quality Measurement: From PSNR to Hybrid Metrics," in *IEEE Trans. Broadcasting*, Dec. 2008.

Huahui Wu, Mark Claypool, and Robert Kinicki, Guidelines for Selecting Practical MPEG Group of Pictures, in Proceedings of IASTED International Conference on Internet and Multimedia Systems and Applications (EuroIMSA), Innsbruck, Austria, Feb. 2006.

Tektronix, An Analysis of MPEG Encoding Techniques on Picture Quality, Jun. 1998.

A. R. Reibman and D. Poole. Characterizing packet loss impairments in compressed video. IEEE ICIP, Sep. 2007.

A. R. Reibrnan et al. Predicting packet-loss visibility using scene characteristics. Packet Video, pp. 308-317, Sep. 2007.

Telchemy, Understanding IP Video Quality Metrics, Sep. 2012, pp. 1-8.

European Patent Office, European Search Report in European Patent Application No. 10 47 1448 (Dec. 27, 2010).

\* cited by examiner

METHOD AND APPARATUS FOR ASSESSING THE QUALITY OF A VIDEO SIGNAL DURING ENCODING OR COMPRESSING OF THE VIDEO SIGNAL

CROSS-REFERENCE TO RELATED APPLICATIONS

This application is a U.S. National Phase application under 35 U.S.C. §371 of International Application No. PCT/EP2011/063091, filed on Jul. 29, 2011, and claims benefit to European Patent Application No. EP 10171448.3, filed on Jul. 30, 2010. The International Application was published in English on Feb. 2, 2012 as WO 2012/013777 A2 under PCT Article 21(2).

FIELD

The invention relates to a method and apparatus for assessing the quality of a video signal during encoding or compressing of the video signal. The video signal may be a non-interactive streaming video or an interactive streaming video.

BACKGROUND

Among the numerous TV distribution services, IPTV (Internet protocol TV) is becoming increasingly important and is more and more replacing analogue or non packet based transmission methods. It is a major responsibility of the broadcast provider towards both content provider and customer to maintain the quality of its service. In large IPTV networks only fully automated quality monitoring probes can fulfil this requirement.

In order to achieve a high degree of satisfaction of the user of video services such as non-interactive streaming video (IPTV, VoD) or static video (DVD), the perceived video quality of those services need to be estimated.

To this aim, video quality models are developed which provide estimates of the video quality as perceived by the user. Those models can for instance output the degree of similarity between the video received at the user side and the original non-degraded video. In addition, and more sophistically, the Human Visual System (HVS) can be modelled. At last, the model can map the results of extensive subjective quality tests.

Video quality models and thus measurement systems are generally classified as follow:
Quality Model Types
   Full Reference (FR): a reference signal is required.
   Reduced-Reference (RR): partial information extracted from the source signal is required.
   No-Reference (NR): no reference signal is required.
Input Parameters Types
   signal/media-based: the decoded image (pixel-information) is required.
   parameter-based: bitstream-level information is required. Information can range from packet-header information, requiring parsing of the packet-headers but not (full- or partial) decoding of the bitstream to the complete decoding of the bitstream.
Type of Application
   Network Planning: the model or measurement system is used before the implementation of the planning in order to plan the best possible implementation.
   Service Monitoring: the model is used during service operation.

Related information of the types of video quality models can be found in references [1], [2], or [3].

In the context of MPEG-based video services, one of the parameters influencing the video perceived quality is the GOP-Structure (GOP=Group of Pictures), including the GOP-length, i.e., the distance between frames which do not require previous or further frames to be decoded, the so-called 'key-frames' or "I-frames". One Group of Picture covers one I-frame and all frames till the next I-frame of the video sequence.

The GOP-structure—and thus GOP-length—is generally chosen as a trade-off between encoding efficiency and error-propagation (see, e.g., references [4], [5], [6]). In these references, the authors provide guidelines for selecting the most appropriate GOP structure for MPEG.

Some models take as input parameters GOP-related parameters but only under packet loss conditions, as in references [2], [7], [8], [9], or [10]. However, they consider only fixed GOP lengths and examine the impact on quality based on the temporal distance of the frame where the packet loss occurs to the next key frame. The quality impact of the GOP-length on encoding is not taken into account.

Quality estimation methods commonly support a distinguished estimation of the quality related to the coding (compression, Qcod) of the video signal and the quality due to packet loss during transmission (Qtrans). Quality estimation methods commonly use one of two approaches to combine an estimation concerning the quality of the compression and the transmission quality. Equation (1) and (2) illustrate the two different approaches $$Q = Q0 - Q\text{cod} - Q\text{trans},\ Q0, Qx\ 0 \ldots 100 \tag{1}$$

$$Q = Q0 * Q\text{cod} * Q\text{trans},\ Q0, Qx\ 0 \ldots 1 \tag{2},$$

in which Q0 represents the base quality or a function of the base quality.

SUMMARY

In an embodiment, the present invention provides a method for assessing the quality of a video signal during encoding or compressing of the video signal. The method includes: estimating the quality (Qcod) of the encoded or compressed video signal using one or more parameters; and using at least one additional parameter to adjust the estimated video signal quality, wherein the at least one additional parameter includes the key-frame rate (kfr) of the video signal as a Group of Pictures (GOP)-length-related parameter. Adjustment of the estimated video signal quality is in accordance with the following equation:

$$Q\text{cod} = (a1 * \text{kfr} + a2) * \exp(b * \text{br}) + c;$$

where a1, a2, b, and c are coefficients and br is the bit-rate of the video signal.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
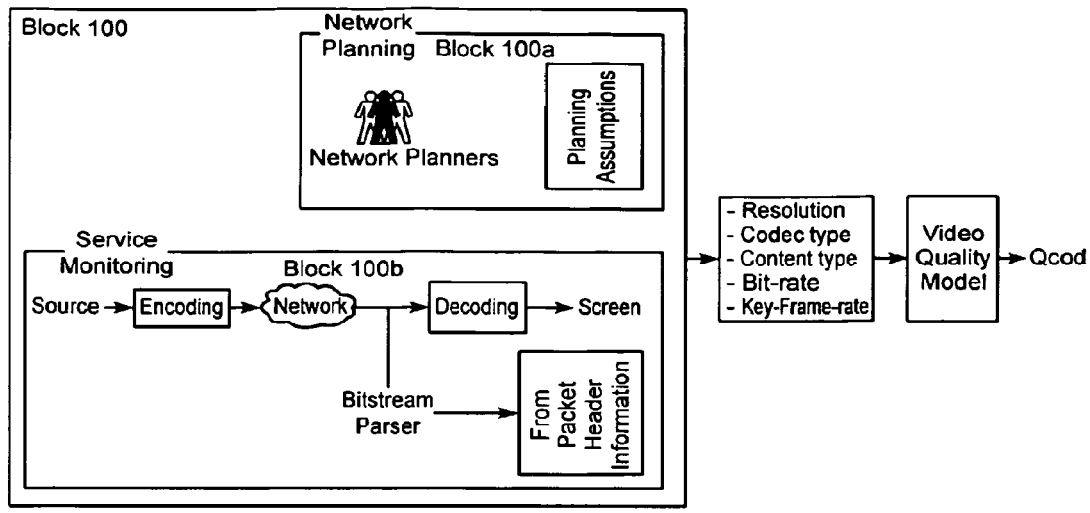
FIG. 1 shows a block diagram of the general framework of the estimation of quality related to compression.

According to a first aspect, the invention provides a method for assessing the quality of a video signal during encoding or compressing of the video signal, the method comprising the steps of:
a) estimating the quality of the encoded or compressed video signal using one or more parameters; and
b) using the length of the Group of Pictures, GOP, and/or GOP-length-related parameters as additional parameter(s) to adjust the estimated video signal quality.

Thus, the method of the invention focuses on the quality estimation of the term characterizing the compression efficiency Qcod. The method of the invention may be combined with different methods for quality estimation of packet loss in video streams.

The method of the invention is a parameter-based video quality model with light-weight parameters, and thus provides a video quality model suitable both for network planning and service monitoring. In case of network planning, values of the parameters are assumed by the network planner, based on knowledge of previously developed similar networks. In case of service monitoring, the model takes as input parameters extracted from the bitstream. In principle, the measurement system in which the method of the invention is embedded can be placed at different locations in the network. However, the closer the probe to the user device is, the more representative of the actual quality at the user side the predicted quality is, when considering packet loss. In case of service monitoring, the parameters do not require access to the payload, and therefore do not require either a partial- or full-decoding of the bitstream. A light-parsing of the packet headers is sufficient for accessing the parameters to be sent to the model, i.e., method. Note that if deeper parsing is allowed, as with un-encrypted data, the parameters can also be used with additional parameters extracted from the bit-stream by partial or full-decoding.

The method of the invention considers the parameters of the encoding process in detail. Known parametric quality estimation methods use the bit-rate, the frame-rate, the video resolution, the codec type and the content type to estimate the quality of a compressed video stream. The invention goes beyond these conventional methods by using the GOP-length or GOP-length-related parameters as an additional parameter for adjusting the estimated video quality. This parameter has a direct impact on the number of bits per frame, and thus on the perceived video quality. As a consequence, the invention considers this parameter as input of the model in addition to the above parameters. With the method of the invention a much more accurate estimation of the related perceived quality can be achieved.

Again, the method of the invention takes as input parameters such as the video resolution, the codec type, the content type, the bit-rate, the frame-rate and the key-frame-rate, and output an estimated video quality (Qcod) based on those parameters. This can be written as in equation (3):

$$Qcod = f(br, fr, cod, cont, res, kfr, I, G) \quad (3)$$

in which
br . . . bitrate, the number of bits per second
fr . . . frame-rate, the number of video frames per second
cod . . . employed codec (for instance H.264 main profile)
cont . . . content type (for instance TVnews, sport, movie, etc.)
res . . . video resolution (for instance High Definition, 1920× 1080 pixels progressive)
kfr . . . key-frame-rate, the number of key-frames per second
I . . . number of bits in an I-frame
G . . . number of bits in a GOP Note that for some of the parameters their values might not be used directly into the function, but as a switch for selecting the appropriate coefficients values of the function.

For instance, a possible model for Qcod in equation (1) for IPTV in which the frame-rate is considered constant is shown in equation (4):

$$Qcod = a * \exp(b * br) + c \quad (4)$$

In equation (4), the values of the a, b and c coefficients depend on the employed video codec, on the video resolution and on the content type. Those coefficients are preferably obtained in a least-square-error curve fitting procedure using the ratings of perception tests as target values.

Following the invention, and still using ratings of perception tests, the key-frame-rate is used as additional parameter into equation (4), yielding equation (5):

$$Qcod = (a1 * kfr + a2) * \exp(b * br) + c \quad (5)$$

The coefficients a1, a2 and b may be obtained in a least-square-error curve fitting procedure using the ratings of perception tests as target values. a1 and a2 depend on the given encore settings and content type.

Figure 2:
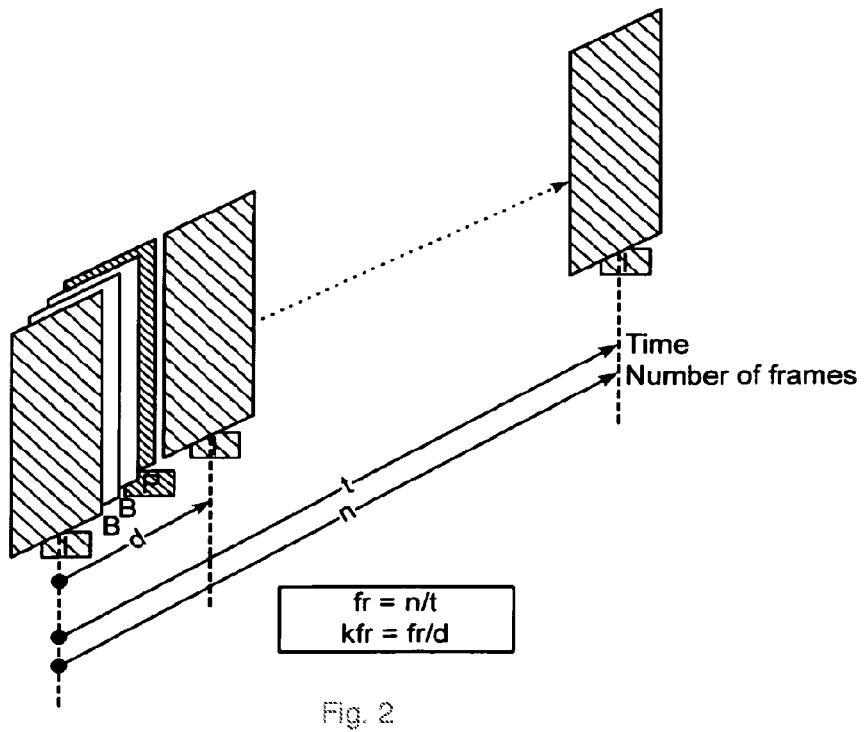
FIG. 2 shows a detailed view of the computation of the key-frame-rate.

The key-frame-rate may be obtained by computing the ratio of the frame-rate over the GOP length (see FIG. 2).

In an alternative embodiment of the invention, the coefficients a1 and a2 can be explicitly dependent on additional information extracted from the bit-stream or packet headers. For example, a1=I/G*a1' and a2=I/G*a2', where a1' and a2' are curve-fitting parameters that represent given encoder settings, but excluding a part of the variability which can directly be measured using I/G. Thus, the impact of the GOP-length and GOP-length-related parameters is modulated by the key-frame size in bytes normalized by the number of bytes in the GOP. Following this alternative embodiment, we obtain equation (6):

$$Qcod = \frac{I}{G} * (a1'kfr * + a2') * \exp(b * br) + c \quad (6)$$

Indeed the influence of the key-frame rate also depends on how the information bits are spread over the GOP. If the information bits are equally spread over the frames of the GOP, and in the considered case of no packet-loss, the key-frame-rate has no influence on the quality. If all information bits are in the I-frame of the GOP, the influence of the key-frame-rate is maximal. This impact of the bit distribution over the GOP is captured by the ratio I/G, where G is the number of bits in a GOP and I is the number of bits in an I-frame.

As explained above, it is preferred according to the invention that the one or more parameter used in step a) of the method is selected from the set comprising: bit rate, frame rate, video resolution, codec type, content type.

The values of the parameters used in step a) may be computed from the packet header information extracted from the bit stream of the video signal and/or derived from side information.

Other aspects, features, and advantages will be apparent from the description that follows, as well as the figures and the claims.

FIG. 1 shows the general framework for estimating the perceived video quality in case of compression degradation only (Qcod) either in case of network planning or in case of service monitoring.

In the case of network planning (block 100*a*), values of the parameters (block 200) to be sent to the video quality model (block 300) are estimated by the network planner. In the case of service monitoring (block 100), the parameters to be sent to the video quality model are computed from the packet header information extracted from the bit-stream.

FIG. 2 shows a detailed view of the computation of the key-frame-rate. As shown in FIG. 2, one GOP covers one I-frame and all frames till the next I-frame. If n is the number of frames on a time window of t or more seconds, then fr=n/t is the frame rate of the video sequence. If d is the number of frames between two I-frames, then kfr=fr/d is the key-frame-rate of the video sequence.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

Furthermore, in the claims the word "comprising" does not exclude other elements or steps. A single unit may fulfil the functions of several features recited in the claims.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

CITED REFERENCES

[1] A. Takahashi, D. Hands, and V. Barriac, "Standardization Activities in the ITU for a QoE Assessment of IPTV," in *IEEE Communication Magazine*, 2008.
[2] S. Winkler and P. Mohandas, "The Evolution of Video Quality Measurement: From PSNR to Hybrid Metrics," in *IEEE Trans. Broadcasting*, 2008.
[3] A. Raake, M. N. Garcia, S. Moeller, J. Berger, F. Kling, P. List, J. Johann, and C. Heidemann, "T-V-MODEL: Parameter-based prediction of IPTV quality," in *Proc. of ICASSP*, 2008.
[4] Huahui Wu, Mark Claypool, and Robert Kinicki, GUIDELINES FOR SELECTING PRACTICAL MPEG GROUP OF PICTURES", In Proceedings of IASTED International Conference on Internet and Multimedia Systems and Applications (EuroIMSA), Innsbruck, Austria, February 2006 <http://web.cs.wpi.edu/~claypool/papers/practical-gop/vGP.pdf>
[5] Arpád Huszák and Sándor Imre, "ANALYSIS GOP STRUCTURE AND PACKET LOSS EFFECTS ON ERROR PROPAGATION IN MPEG-4 VIDEO STREAMS", in Proceedings of the 4$^{th}$ International Symposium on Communications, Control and Signal Processing 2010 (ISCCP 2010), Limassol, Cyprus, 3-5 Mar. 2010
[6] Tektronix, "An Analysis of MPEG Encoding Techniques on Picture Quality", June 1998.
[7] A. R. Reibman and D. Poole. Characterizing packet loss impairments in compressed video. *IEEE ICIP*, September 2007.
[8] A. R. Reibman et al. Predicting packet-loss visibility using scene characteristics. Packet Video, pages 308-317, September 2007.
[9] JP002006033722AA, NTT, "Image quality control method and image quality control system"
[10] <http://www.telchemy.com/appnotes/Understanding%20IP%20Video%20Quality%20Metrics.pdf>

The invention claimed is:

1. A method for assessing the quality of a video signal during encoding or compressing of the video signal, the method comprising the steps of:
   estimating, by a video quality processor, the quality (Qcod) of the encoded or compressed video signal using one or more parameters;
   using, by the video quality processor, at least one additional parameter to adjust the estimated video signal quality, wherein the at least one additional parameter includes the key-frame rate (kfr) of the video signal as a Group of Pictures (GOP)-length-related parameter; and
   outputting, by the video quality processor, the adjusted estimated video signal quality;
   wherein the adjustment of the estimated video signal quality is in accordance with the following equation:

$$Q\text{cod} = (a1 * \text{kfr} + a2) * \exp(b * \text{br}) + c;$$

where a1, a2, b, and c are coefficients and br is the bit-rate of the video signal.

2. The method of claim 1, wherein the one or more parameters include at least are of a bit rate, a frame rate, a video resolution, a codec type, and a content type.

3. The method of claim 1, wherein values of the one or more parameters are computed from packet header information extracted from a bitstream of the video signal.

4. The method of claim 1, wherein values of the one or more parameters are derived from side information.

5. The method of claim 1, wherein the at least one additional parameter includes one or more further additional parameters including at least one of a number of bits in an I-frame, and a number of bits in a Group of Pictures.

6. The method of claim 1, wherein coefficients a1 and a2 are obtained by applying a least-square-error curve fitting procedure using ratings of perception tests as target values.

7. The method of claim 1, wherein the coefficients a1 and a2 are dependent on additional information extracted from a bitstream or packet headers.

8. The method of claim 7, wherein the coefficients a1 and a2 are calculated using number I of bits in an I-frame and the number G of bits in a Group of Pictures according to the following equations:

$$a1 = I/G * a1'$$

$$a2 = I/G * a2'$$

so that the estimated video signal quality is in accordance with the following equation:

$$Qcod = \frac{I}{G} * (a1' kfr * + a2') * \exp(b * br) + c$$

where a1 and a2 represent given encoder settings;
wherein a1' and a2' are obtained by applying a least-square-error curve fitting procedure using the ratings of perception tests as target values.

9. The method of claim 2, wherein the frame rate of the video corresponds to fr=n/t, where fr is the frame rate and n is the number of frames on a time window of t or more seconds.

10. The method of claim 1, wherein kfr=fr/d is the key-frame-rate of the video sequence, where d is the number of frames between two I-frames of the video sequence.

11. The method of claim 1, wherein the video signal is a non-interactive streaming video or an interactive streaming video.

12. The method of claim 1, further comprising at least one of:
estimating the quality due to packet loss during transmission of the video signal; or
estimating the base quality of the video signal.

13. The method of claim 12, wherein the method comprises a linear function of a combination of estimating the quality due to packet loss during transmission of the video signal and estimating the base quality of the video signal.

14. The method of claim 12, wherein the method comprises a multiplicative function of a combination of estimating the quality due to packet loss during transmission of the video signal and estimating the base quality of the video signal.

15. An apparatus for assessing the quality of a video signal during encoding or compressing of the video signal, the apparatus comprising a non-transitory processor-readable medium, the non-transitory processor-readable medium having processor-executable instructions stored thereon, the processor-executable instructions including instructions for:
estimating, by an estimator unit, the quality (Qcod) of the encoded or compressed video signal using one or more parameters; and
adjusting, by an adjustor unit, the estimated video signal quality using a key-frame-rate of the video signal as a Group of Pictures (GOP)-length-related parameter as at least one additional parameter; and
outputting the adjusted estimated video signal quality;
wherein the adjustment of the estimated video signal quality is in accordance with the following equation:

$$Q\text{cod}=(a1*\text{kfr}+a2)*\exp(b*\text{br})+c;$$

where a1, a2, b, and c are coefficients and br is the bit-rate of the video signal.

* * * * *